(12) United States Patent
Whittenberger et al.

(10) Patent No.: US 7,682,580 B2
(45) Date of Patent: Mar. 23, 2010

(54) CATALYTIC REACTOR HAVING RADIAL LEAVES

(75) Inventors: William A. Whittenberger, Leavittsburg, OH (US); David A. Becker, Hiram, OH (US)

(73) Assignee: Catacel Corp., Garrettsville, OH (US)

( * ) Notice: Subject to any disclaimer, the term of this patent is extended or adjusted under 35 U.S.C. 154(b) by 1048 days.

(21) Appl. No.: 11/132,691

(22) Filed: May 19, 2005

(65) Prior Publication Data

US 2006/0263278 A1   Nov. 23, 2006

(51) Int. Cl.
*B01J 8/02* (2006.01)
(52) U.S. Cl. ............ 422/222; 422/180; 502/527.11
(58) Field of Classification Search .......... None
See application file for complete search history.

(56) References Cited

U.S. PATENT DOCUMENTS

| | | | |
|---|---|---|---|
| 1,979,187 A | 10/1934 | Bindley |
| 3,857,680 A | 12/1974 | Porta et al. |
| 4,162,290 A | 7/1979 | Crawford |
| 4,400,309 A | 8/1983 | McMahon |
| 4,713,234 A | 12/1987 | Weirich |
| 4,830,834 A | 5/1989 | Stahl |
| 4,844,837 A | 7/1989 | Heck |
| 5,004,592 A | 4/1991 | Pinto |
| 5,039,510 A | 8/1991 | Pinto |
| 5,272,876 A | 12/1993 | Sheller |
| 5,300,275 A | 4/1994 | Lywood |
| 5,925,328 A | 7/1999 | Stahl |
| 5,932,141 A | 8/1999 | Rostrop-Nielsen |
| 6,077,459 A | 6/2000 | Laursen |
| 6,274,113 B1 | 8/2001 | Heyse |
| 6,319,877 B1 | 11/2001 | Christensen |
| 6,482,375 B1 | 11/2002 | van der Wal |
| 6,576,158 B1 | 6/2003 | Christensen |
| 6,746,624 B1 | 6/2004 | Christensen |

FOREIGN PATENT DOCUMENTS

WO   WO 00/05168 A   2/2000

*Primary Examiner*—Jennifer A Leung
(74) *Attorney, Agent, or Firm*—Pearne & Gordon LLP

(57) ABSTRACT

A reactor includes a plurality of metal leaves which extend from an interior of the reactor to its exterior. The leaves occupy a space between an internal mandrel and an external tube. In one embodiment, the leaves are generally flat pieces of foil, stacked together so that they do not touch except at spacers formed in the pieces. In another embodiment, the leaves are formed of a pleated and crimped foil, each leaf being defined by a piece of foil that has been folded over upon itself. In both embodiments, the leaves extend from the internal mandrel, radially outward to an inner surface of the tube. The reactor facilitates the transfer of heat between the outside of the reactor and its inside region.

18 Claims, 7 Drawing Sheets

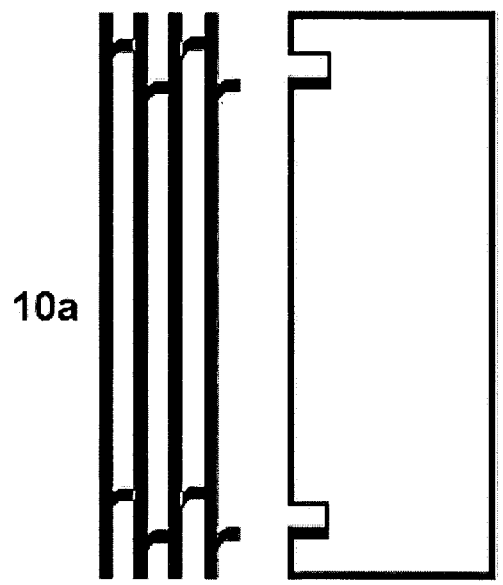
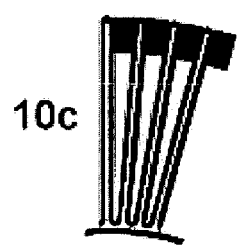
Figures 10a-10c
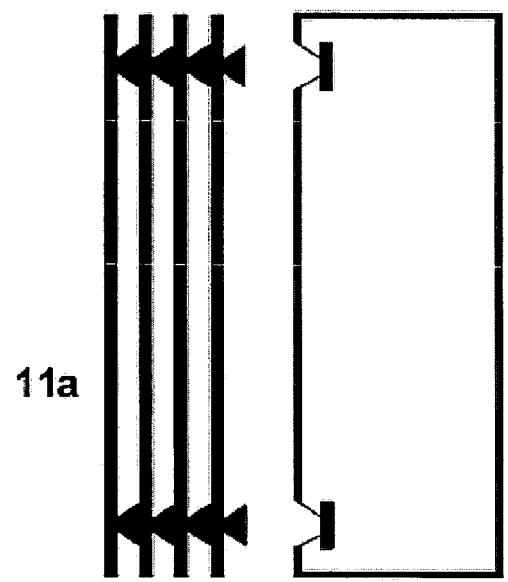
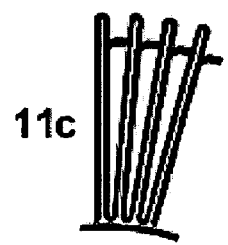
Figures 11a-11c

CATALYTIC REACTOR HAVING RADIAL LEAVES

BACKGROUND OF THE INVENTION

This invention relates to the field of surface catalytic reactions and/or heat exchange. The present invention provides a reactor which fits within a cylindrical tube, and which effectively transfers heat from the exterior of the tube to the interior of the reactor, or from the interior of the reactor to the tube.

The reactor of the present invention achieves the same objectives as those of the catalyst supports described in copending U.S. patent application Ser. No. 10/896,302, filed Jul. 21, 2004, and in copending U.S. patent application Ser. No. 11/105,973, filed Apr. 14, 2005. The disclosures of both of the above-mentioned applications are incorporated by reference herein.

One of the objectives of the reactors described in the above-cited applications is to avoid the problems associated with the use of ceramic materials in the manufacture and operation of catalytic reactors. Packed bed ceramic catalysts have the disadvantage that they have low thermal conductivity, making it difficult to transfer heat from the periphery of the reactor to the inside, or vice versa. Also, the thermal mismatch between the metal and ceramic portions of prior art reactors eventually leads to pulverization of the ceramic material, thus limiting the useful life of the reactor. Like the devices described in the above-cited applications, the present invention also comprises an all-metal structure which inherently avoids these problems.

The reactors in the above-cited applications have a spiral, or truncated spiral structure. The reactor of the present invention has leaves that are not spiral, but instead extend radially outward from the interior of the reactor to its exterior. This arrangement provides improved heat transfer between the exterior and the interior of the reactor.

The reactor of the present invention can be used, for example, in the field of catalytic fuel reforming, to make hydrogen, which is then used in generating electricity through a fuel cell, or in other industrial processes such as oil and gas refining, ammonia and fertilizer production, hydrogenation of oils and chemicals, and iron ore reduction. The reactor could be used as a catalytic or non-catalytic combustor, or as a simple heat exchanger.

SUMMARY OF THE INVENTION

The reactor of the present invention comprises a plurality of metal leaves which extend radially outward from an interior region, to an exterior of the reactor. The metal leaves are preferably formed around a mandrel or pipe, and the mandrel and leaves are then inserted within a tube that encloses the reactor. If the reactor is catalytic, the leaves are at least partly coated with a suitable catalyst.

In one embodiment, the leaves are formed of a plurality of generally flat, and optionally slightly bent, pieces of metal foil. The major portion of each piece is a flat, central region, and each piece optionally has relatively narrow edge portions which are angled slightly relative to the central region. The pieces have spacers, which could be bumps or dimples formed in each piece, arranged in a staggered manner, so that when the leaves are stacked, they are spaced apart and do not nest together. Thus, when the leaves are arranged around the mandrel, they do not touch each other except through the spacers.

In another embodiment, the leaves are formed from a pleated and crimped piece of metal foil. Each leaf of the reactor comprises a pair of pleats that have been folded over each other and crimped. The leaves are spaced apart from each other towards the exterior of the reactor, but are compressed together near the interior region of the reactor. If the reactor is catalytic, the metal used to form the leaves is coated with catalyst on only one side.

In both of the above embodiments, the leaves occupy the space having an annular cross-section, located between the mandrel and the inner surface of the tube. In both embodiments, at least some of the leaves, and preferably all of the leaves, touch the mandrel and extend radially outward, touching the interior surface of the tube. Thus, heat is readily transferred between the outside and the inside of the reactor, and such heat penetrates throughout the inside.

The invention also includes the method of making the reactor. For the first embodiment, the method includes forming the leaves, stacking them around a mandrel so that they do not nest together, and inserting the structure into the tube. The leaves may be held together by metal bands. A pair of washers, or their equivalent, may be attached to the mandrel to prevent the leaves from moving axially.

In the second embodiment, the method includes forming a piece of flat metal foil into a pleated structure, crimping the pleats, and arranging the pleated, crimped structure around the mandrel as before. In the second embodiment, if the reactor is to operate catalytically, the method includes coating the foil with catalyst on one side only.

The invention therefore has the primary object of providing a reactor which efficiently transfers heat from a region exterior to the reactor, to an interior region of the reactor, or vice versa.

The invention has the further object of providing a reactor having metal leaves which extend radially outward, from an internal mandrel to an external tube.

The invention has the further object of providing a reactor in which heat is effectively transferred to and from substantially an entire interior region of the reactor.

The invention has the further object of improving the heat transfer efficiency of catalytic reactors and heat exchangers.

The reader skilled in the art will recognize other objects and advantages of the invention, from a reading of the following brief description of the drawings, the detailed description of the invention, and the appended claims.

BRIEF DESCRIPTION OF THE DRAWINGS

FIGS. 10a-10c provide diagrams showing the use of folded tabs in the foil, for the purpose of keeping adjacent layers of foil apart, FIG. 10a comprising a top view of a fragment of the reactor, FIG. 10b comprising a plan view of a folded leaf of foil, and FIG. 10c comprising a fragmentary end view of the reactor.

FIGS. 11a-11c provide diagrams showing a different arrangement of folded tabs in the foil, also for the purpose of keeping adjacent layers of foil apart, FIG. 11a comprising a top view of a fragment of the reactor, FIG. 11b comprising a plan view of a folded leaf of foil, and FIG. 11c comprising a fragmentary end view of the reactor.

DETAILED DESCRIPTION OF THE INVENTION

The reactor of the present invention comprises a plurality of metal leaves which occupy a space between an internal mandrel or pipe, and an external hollow tube. The mandrel is blocked off, so that gas flows only through the region occupied by the leaves. This region has an annular cross-section. The reactor may include multiple sections disposed within the tube, as described in application Ser. No. 11/105,973 cited above, each section having the structure described in this specification.

A first embodiment of the reactor of the present invention is illustrated in FIGS. 1-4. In this embodiment, a plurality of metal leaves are stacked together to occupy the annular space between the internal mandrel and the inner surface of the reactor tube.

Figure 1A:
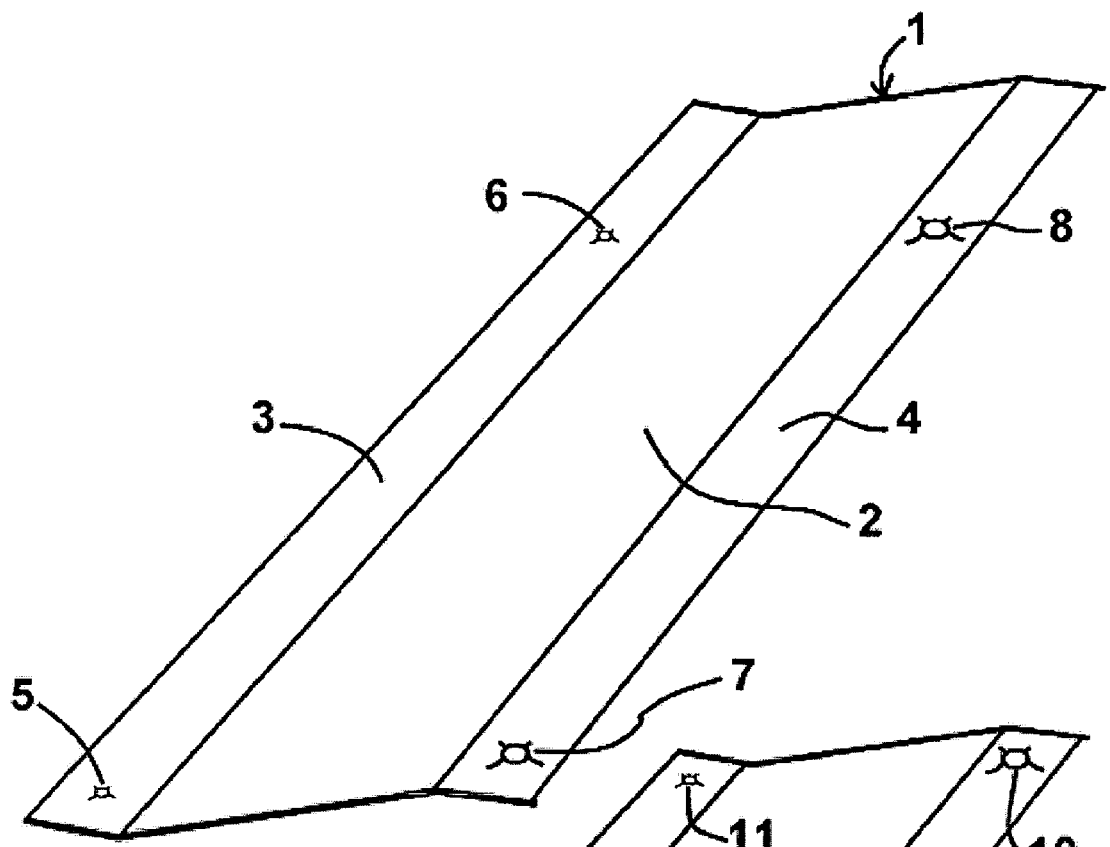
FIGS. 1a and 1b provide perspective view of metal leaves used in making the reactor of one embodiment of the present invention.
Figure 1B:
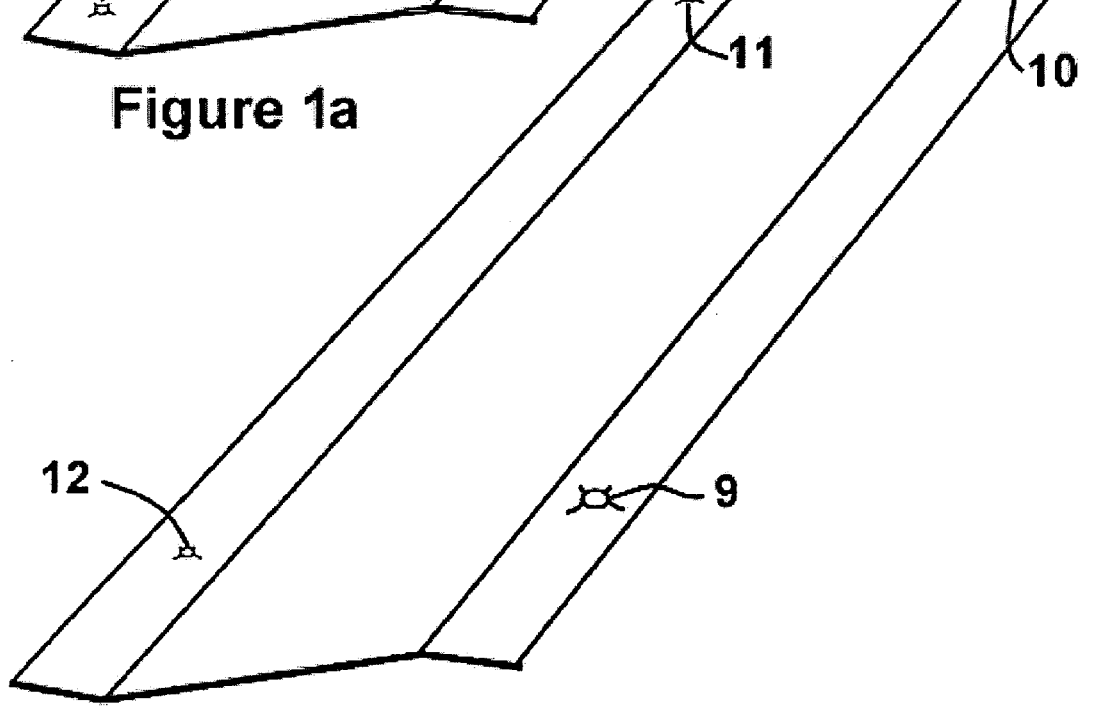

FIGS. 1a and 1b depict the metal leaves which will be stacked to form the reactor. Each leaf 1 comprises a generally rectangular piece of metal, defining a central, flat region 2 and, optionally, flat edge portions 3 and 4 which are angled relative to the central region. That is, the edge portions are bent relative to the central region, the angle of bending being small, of the order of about five degrees. This bent structure provides stiffness to the leaf, so that it tends to hold its desired position over the length of the reactor section. The bent structure is preferable but not absolutely necessary, especially if the invention is practiced with relatively thick leaves.

The leaf 1 also has protuberances or "bumps" 5-8, positioned along the edge portions. Preferably, there are two or more such bumps on each edge portion. Adjacent leaves in the stack have bumps that are offset relative to each other so that the bumps of one leaf will not nest into the bumps of the adjacent leaves. The bumps therefore comprise spacers which maintain separation between adjacent leaves. This feature is illustrated in FIG. 1b, which shows a leaf having bumps 9-12 which are located at positions which do not coincide with those of bumps 5-8.

Figure 2:
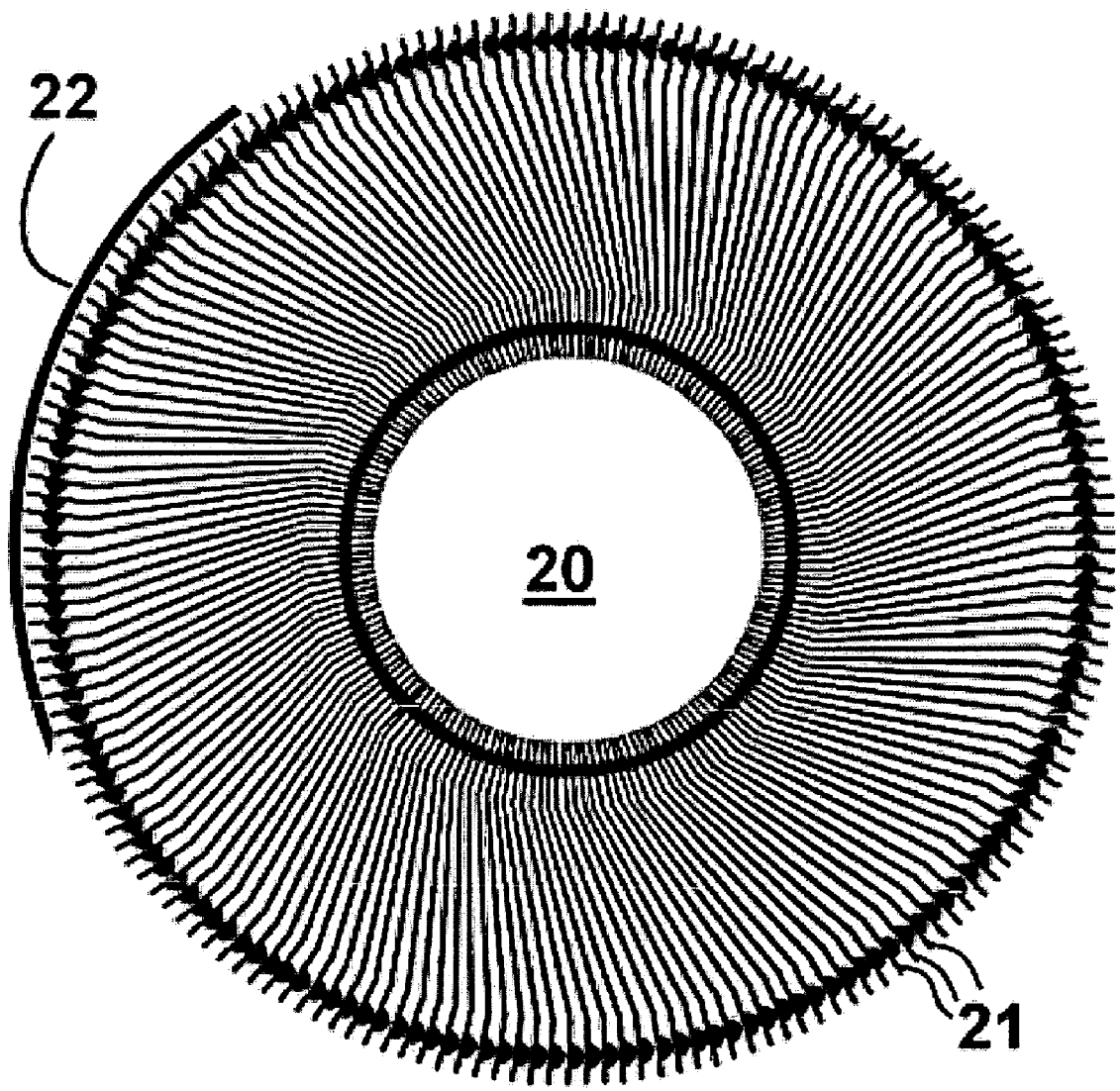
FIG. 2 provides an end view of a plurality of metal leaves, arranged to define the reactor of one embodiment of the present invention, and showing a fragment of the hollow tube in which the leaves are inserted.

FIG. 2 provides an end view of a structure in which the leaves have been stacked to form a reactor. The leaves extend from an interior region 20 to an exterior of the reactor. The interior region is defined by a mandrel or hollow pipe (not shown in FIG. 2) around which the leaves are arranged. Gas flows in a direction perpendicular to the paper. The interior region 20 is blocked off, so that gas cannot flow through it. The gas therefore flows only in the annular region occupied by the leaves. FIG. 2 also shows the optional bends in each leaf, described above, and shows that the flat, central regions of the leaves occupy the majority of the annular space. As shown in FIG. 2, a given leaf does not normally touch an adjacent leaf, except at the bumps.

Figure 3:
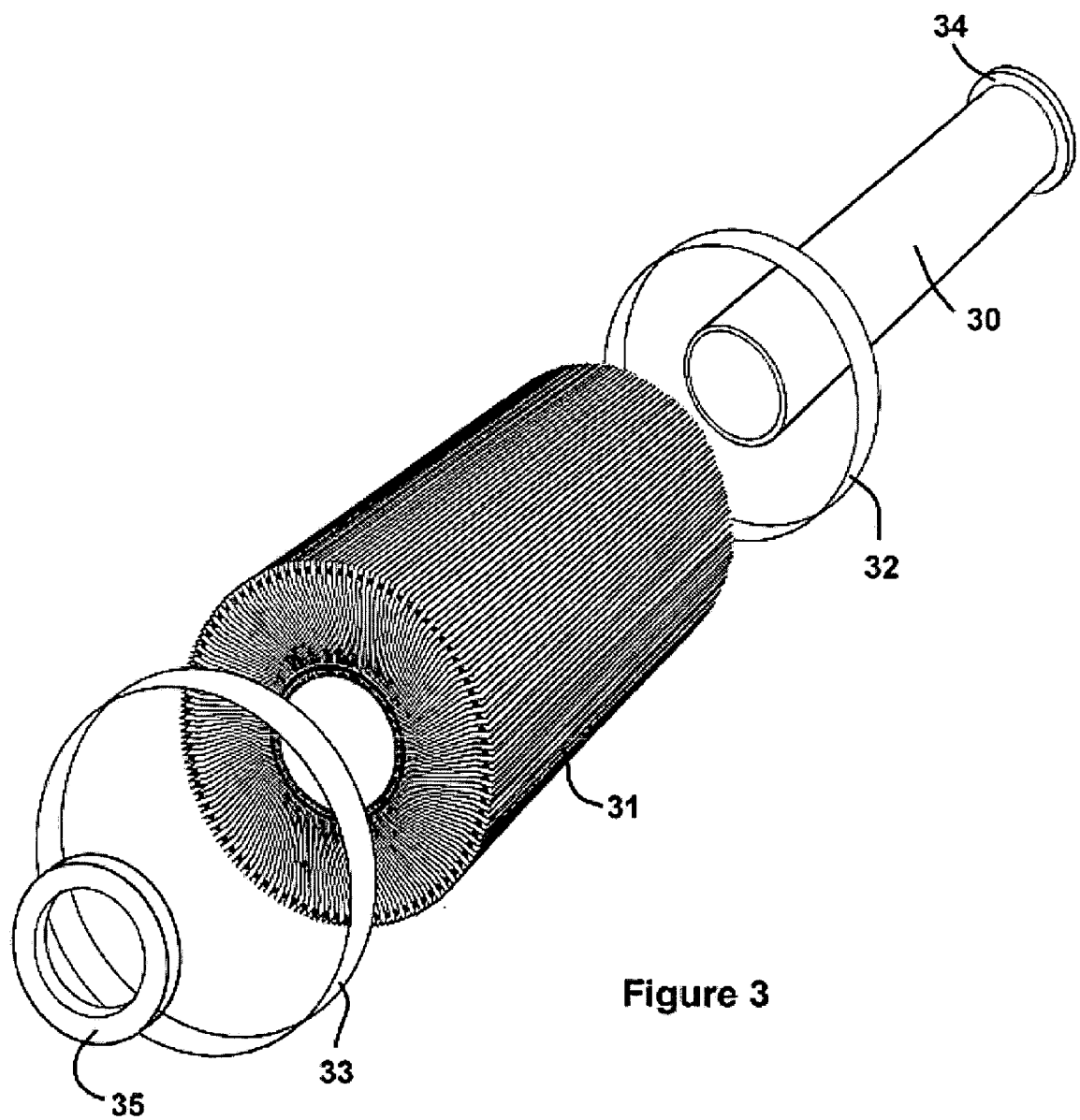
FIG. 3 provides an exploded perspective view of the reactor of one embodiment of the present invention.
Figure 4:
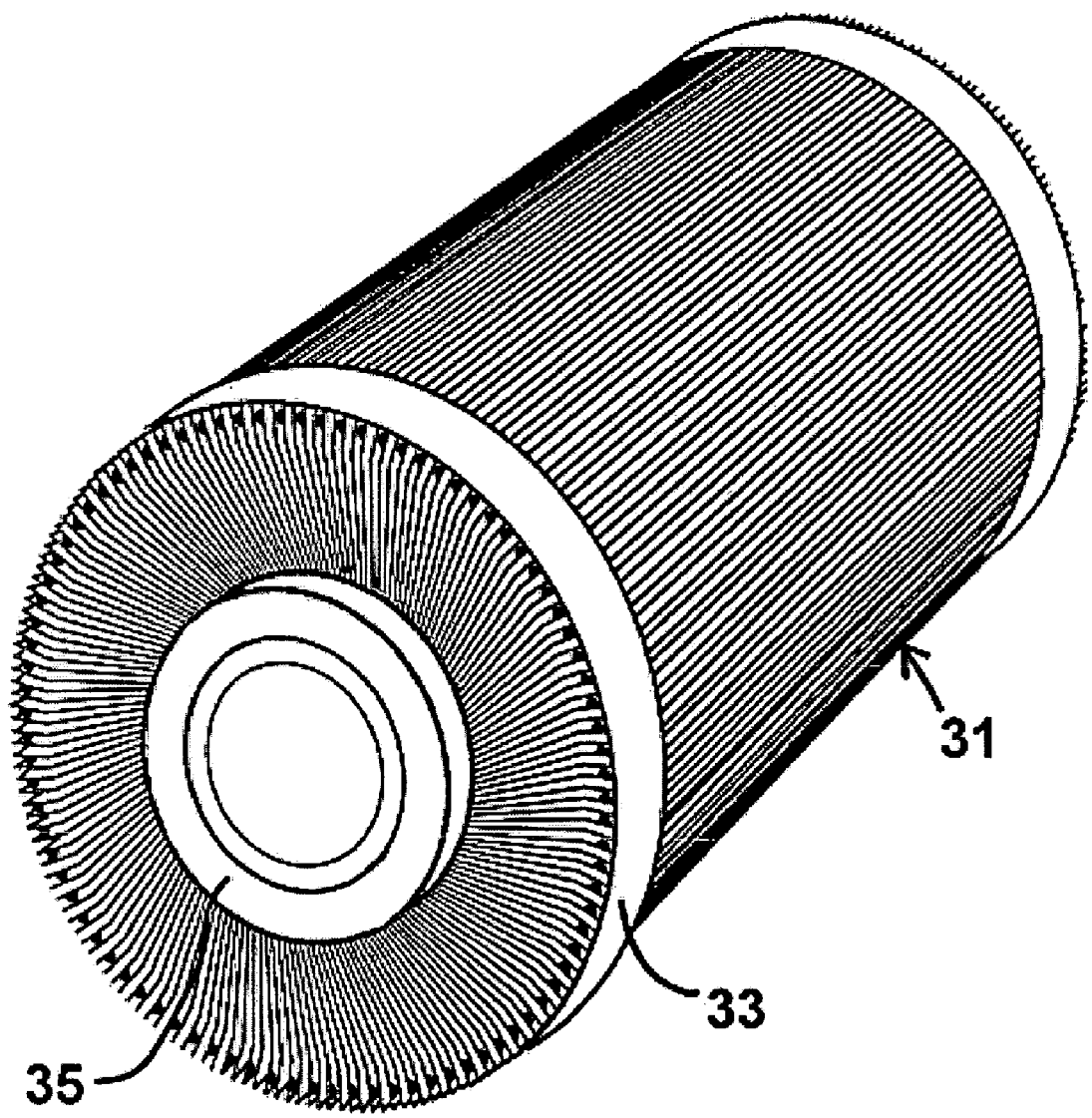
FIG. 4 provides a perspective view of the completed reactor of one embodiment of the present invention.
Figure 5:
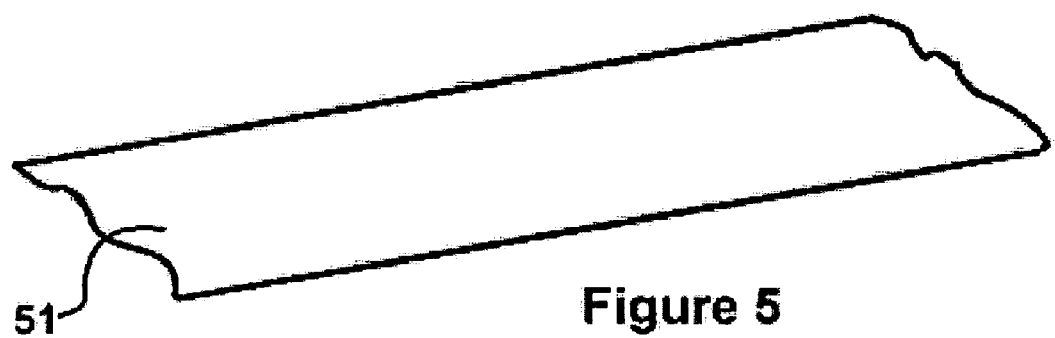
FIG. 5 provides a fragmentary perspective view of a flat piece of foil used to form the reactor of a second embodiment of the present invention.
Figure 6:
FIG. 6 provides a fragmentary perspective view of a corrugated or pleated piece of foil, formed from the foil of FIG. 5, used to make the reactor of the second embodiment.

FIG. 3 shows an exploded perspective view of the reactor of the first embodiment of the invention, and FIG. 4 shows a perspective view of the assembled structure, not including the outer tube. Monolith 31, formed of a plurality of leaves, of the type shown in FIG. 2, is disposed around mandrel or pipe 30. Thin metal bands 32 and 33 hold the structure together at both ends. Washers 34 and 35 are welded to the ends of the pipe 30 to trap the leaves. The washers thus comprise means for preventing the leaves from moving axially. FIG. 4 shows the same structure in an assembled condition.

In one preferred embodiment, the leaves are essentially flat pieces of metal foil, having a thickness of about 0.004 inches. This dimension is given by way of example, and is not intended to limit the invention.

The mandrel or hollow pipe 30 is blocked off internally to prevent gas from flowing through it. Alternatively, the mandrel could be a solid piece that inherently blocks gas flow. If the reactor is catalytic, the leaves are completely coated with catalyst. In the embodiment shown, it is preferred to coat both sides of each leaf.

The finished structure can then be inserted within a hollow cylindrical tube (shown in fragmentary form in FIG. 2, as indicated by reference numeral 22) which houses the reactor.

The dimensions of the leaves are chosen such that the outer edges of the leaves touch the inner surface of the hollow tube. That is, the width of each leaf is approximately equal to the radial distance between the mandrel and the inner surface of the tube (i.e. one-half the difference between the inner diameter of the tube and the outer diameter of the mandrel). The length of each leaf corresponds to the length of the reactor section.

In one specific example of a typical reactor, the outer tube has an inner diameter of about four inches, and the mandrel has an outer diameter of about one inch. In this case, the leaves may be about 1.5 inches wide and about 6-12 inches long. Such a reactor will contain about 150-250 leaves, with 180 being a preferred number. The above numbers are only exemplary, and are not intended to limit the invention. The invention can be scaled up or down, and can be practiced with many different choices of dimensions.

A second embodiment of the invention is illustrated in FIGS. 5-11.

The reactor of the second embodiment begins with a flat, generally rectangular piece of foil 51. The foil is corrugated or folded to form the pleated structure shown in FIG. 6. The pleated foil has a pleat length L. The value of L is chosen to be about the same as the radial distance between an inner mandrel and an outer tube of the reactor to be constructed (one-half the difference between the inner diameter of the tube and the outer diameter of the mandrel).

The folds of pleated foil 51 are pinched or crimped together, as illustrated by reference numerals 52 and 53 of FIG. 7. The crimped folds may also be welded together, such as by tack welding, as indicated by arrows 54 and 55.

Figure 7:
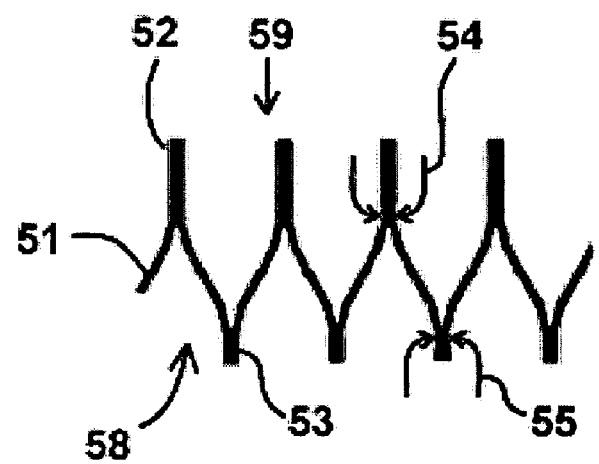
FIG. 7 provides a fragmentary end view of the pleated foil of FIG. 6, in which the ends of the folds have been pinched together.

It is the structure of FIG. 7 that is then arranged around a mandrel or pipe. The pleated and crimped structure of FIG. 7 defines an "inside" region, indicated by reference numeral 58, and an "outside" region, indicated by reference numeral 59. The pleated and crimped structure, if it is to be used as a catalytic reactor, is coated with catalyst only on the outside. The reason for coating only on one side is that, when the pleated structure is installed on the mandrel, the pleats will be so compressed together that substantially no gas will flow in the region defined by the inside portion. The folds are collapsed such that the cross-sectional area of the region between folds is negligible. The latter concept is better illustrated in FIG. 8.

Figure 8:
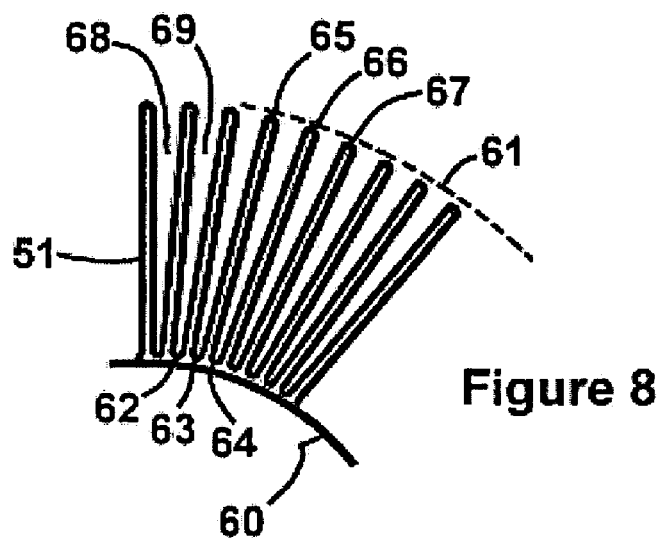
FIG. 8 provides a fragmentary end view showing the positioning of the pleated foil of FIG. 7 around a mandrel, to form the essential structure of the reactor of the second embodiment of the invention.

FIG. 8 shows the pleated foil 51 disposed around mandrel or pipe 60. The radially outer ends of the foil are intended to contact the interior wall of a tube 61. The mandrel and tube are similar to those of the other embodiment. Because the diameter of the mandrel 60 is, by definition, less than the inside diameter of the tube 61, the crimped folds (such as those designated by reference numerals 62, 63, and 64) which touch the mandrel are spaced much more closely together than are the crimped folds (such as 65, 66, and 67) which touch the interior wall of tube 61. Indeed, the crimping of the folds, and their arrangement around the mandrel, defines a plurality of radial leaves, each leaf having a double thickness. That is, each pair of adjacent folds forms one radial leaf, and that leaf has the effective thickness of two pieces of foil.

It is therefore the compression of the folds, as shown in FIG. 8, that causes the "inside" region of the foil to have negligible cross-sectional area. Substantially no gas flows through this side. Virtually all of the gas, which flows in a direction perpendicular to the paper, flows in the "outside" region, i.e. in the spaces such as those designated by reference numerals 68 and 69, between the radial leaves.

The pleated foil is wrapped around a mandrel or pipe, which may be solid, or which may be hollow, in which case it should be blocked off at some location. If the piece of pleated foil does not extend completely around the mandrel, additional pieces of pleated foil can be used to complete the structure. If two or more pieces of pleated foil are needed, the pieces can be connected to each other by spot welding, or by arranging a piece such that some of its folds overlap with folds of the next piece. When the structure has been completed, it is inserted within the reactor tube, which is generally cylindrical. The structure is inserted into the tube with a slight twisting motion, so that all leaves make physical contact with the inner wall of the reactor tube.

It may be necessary to provide spacers to insure that the leaves are separated from each other, so as to insure that gas will flow through as intended. There are at least three ways to provide such spacers, as illustrated by FIGS. 9-11.

Figures 9A, 9B, 9C:
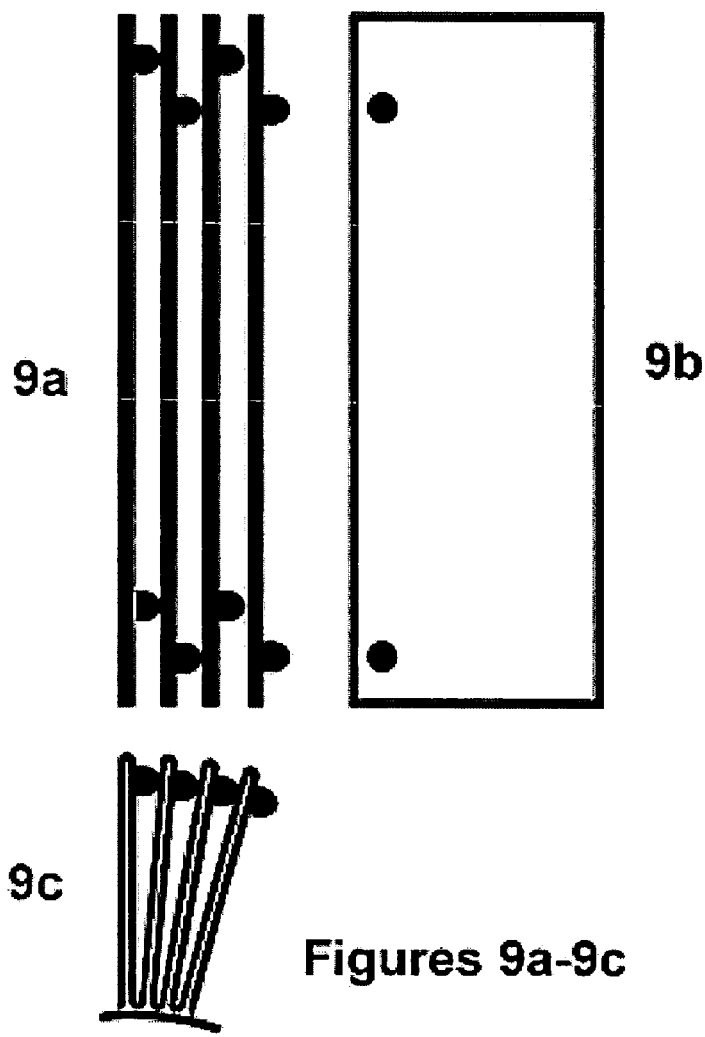
FIGS. 9a-9c provide diagrams showing the use of dimples or bumps in the foil, for the purpose of keeping adjacent layers of foil apart, FIG. 9a comprising a top view of a fragment of the reactor, FIG. 9b comprising a plan view of a folded leaf of foil, and FIG. 9c comprising a fragmentary end view of the reactor.

In FIGS. 9a-9c, there are bumps or dimples, formed on the foil, to hold the ends of the foil apart. FIG. 9c shows the pleated foil arranged around a mandrel as in FIG. 8. FIG. 9a provides a top view of the fragment of the reactor shown in FIG. 9c, each illustrated layer in FIG. 9a including two layers of folded foil. FIG. 9b provides a plan view of the foil. FIG. 9c clearly shows that the bumps or dimples maintain a spacing between the ends of the pleated foil.

Alternatively, the spacers could be created by cutting and bending an edge of the pleat, as shown in FIGS. 10 and 11.

In FIGS. 10a-10c, rectangularly shaped spacing tabs are notched and bent such that the hinge line holding the tab is arranged in the radial direction of the leaf. The tabs in every other leaf must be offset. Otherwise, the tab of one leaf would fall into the notch of the adjacent leaf. FIG. 10a provides a top view of the reactor of FIG. 10c, and FIG. 10b provides a plan view of a piece of foil.

In FIGS. 11a-11c, keystone-shaped spacing tabs are notched and bent such that the hinge line holding the tab is arranged in the axial direction of the leaf, i.e. the hinge line being perpendicular to the paper in FIG. 11c. Because of the keystone shape, no offset is needed for adjacent leaves. FIG. 11a provides a top view of the reactor of FIG. 11c, and FIG. 11b provides a plan view of the foil.

Although their structures are somewhat different, both the embodiment of FIGS. 1-4 and the embodiment of FIGS. 5-11 have radial leaves. That is, they both have leaves that extend directly from the outer surface of a mandrel to the inner surface of a reactor tube. In the first embodiment, the leaves are distinct pieces of foil. In the second embodiment, a plurality of leaves are defined by a single piece of pleated foil, each leaf being formed of two layers of the foil. Thus, if the same foil were used to construct both embodiments, the leaves of the second embodiment would have an effective thickness which is double that of the leaves of the first embodiment. In the first embodiment, the leaves normally do not touch, in the vicinity of the mandrel, except through the bumps. In the second embodiment, the leaves normally touch each other in the vicinity of the mandrel, but not in the vicinity of the outer tube.

Flow in the reactor of the present invention is generally laminar. Because of the radial pattern of the leaves, heat from outside the reactor can be easily transferred to the interior of the reactor, or from the inside to the outside (in the case of exothermic reactions), by conduction, convection, and/or radiation.

The invention can be modified in various ways. The dimensions of the reactor can be varied, as noted above, by varying the dimensions of the foil. Other means for maintaining separation between the leaves can be used. In both embodiments, the foil can be coated with catalyst in whole or in part, to suit the needs of a specific application. These and other modifications, which will be apparent to the reader skilled in the art, should be considered within the spirit and scope of the following claims.

What is claimed is:

1. A reactor comprising a plurality of metal leaves, each leaf extending from an interior region to an exterior region of the reactor, at least some of the leaves being at least partly coated with a catalyst, the interior region being bounded by a generally cylindrical pipe, the exterior region being bounded by a generally cylindrical tube, each leaf extending toward but not penetrating through the pipe, each leaf comprising (a) a flat central portion disposed in a central region between the pipe and the tube and (b) a first flat edge portion located between the central portion and the pipe and angled relative to the central portion, each first flat edge portion extending outwardly from the pipe and being interleaved between a pair of adjacent first flat edge portions.

2. The reactor of claim 1, each leaf further comprising a second flat edge portion located between the central portion and the tube and angled relative to the central portion.

3. The reactor of claim 2, said flat central portion having a first flat surface and an opposite second flat surface, said first flat edge portion angling toward said first flat surface, said second flat edge portion angling away from said first flat surface.

4. The reactor of claim 1, each leaf having a crease where the first flat edge portion angles relative to the central portion.

5. The reactor of claim 1, wherein the first flat edge portion makes an angle of less than about five degrees relative to the central portion.

6. The reactor of claim 1, further comprising means for preventing the leaves from moving axially.

7. The reactor of claim 1, wherein each leaf includes a spacer for maintaining a separation between the leaf and an adjacent leaf.

8. The reactor of claim 7, wherein the spacer comprises a bump formed in the leaf, the bump of a given leaf being offset relative to a bump of an adjacent leaf.

9. The reactor of claim 1, each leaf extending toward the tube but being free from mechanical fixation to the tube.

10. A reactor comprising a plurality of metal leaves, each leaf extending from an interior region to an exterior region of the reactor, at least some of the leaves being at least partly coated with a catalyst, the interior region being bounded by a generally cylindrical pipe, the exterior region being bounded by a generally cylindrical tube, each leaf extending toward but not penetrating through the pipe, each leaf being formed of a pleated metal foil, wherein each leaf comprises a pleat that has been folded over and pinched so that at least a terminal portion of the pleat is compressed together.

11. The reactor of claim 10, wherein the foil forming the leaves is coated with catalyst only on one side, wherein the leaves are coated only on a side directed toward the exterior of the reactor.

12. The reactor of claim 10, wherein the leaves are spaced apart from each other near the exterior region of the reactor, and wherein the leaves are compressed together near the interior region of the reactor.

13. The reactor of claim 10, wherein each leaf includes a spacer for maintaining a separation between the leaf and an adjacent leaf.

14. The reactor of claim 2, each leaf (a) having a crease where the first flat edge portion angles relative to the central portion, and (b) having a crease where the second flat edge portion angles relative to the central portion.

15. The reactor of claim 1, each first flat edge portion extending substantially radially from the pipe.

16. The reactor of claim 10, wherein each leaf comprises a pleat that has been folded over and compressed together along substantially the whole length of the leaf.

17. The reactor of claim 10, further comprising means for preventing the leaves from moving axially.

18. The reactor of claim 13, wherein the spacer comprises a bump formed in the leaf, the bump of a given leaf being offset relative to a bump of an adjacent leaf.

* * * * *